(12) United States Patent
Tsukamoto

(10) Patent No.: US 8,519,723 B2
(45) Date of Patent: Aug. 27, 2013

(54) INPUT DEVICE AND METHOD OF PRODUCING INPUT APPARATUS

(75) Inventor: Koji Tsukamoto, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 232 days.

(21) Appl. No.: 13/236,393

(22) Filed: Sep. 19, 2011

(65) Prior Publication Data
US 2012/0098551 A1  Apr. 26, 2012

(30) Foreign Application Priority Data
Oct. 20, 2010  (JP) ................. 2010-235041

(51) Int. Cl.
*G01R 27/26* (2006.01)

(52) U.S. Cl.
USPC ........................................ 324/658

(58) Field of Classification Search
None
See application file for complete search history.

(56) References Cited

U.S. PATENT DOCUMENTS

| 6,330,145 | B1 * | 12/2001 | Lepert et al. ............ 361/220 |
| 2005/0146516 | A1 | 7/2005 | Nishiyama |
| 2007/0068779 | A1 * | 3/2007 | Baldo et al. ............ 200/16 R |

FOREIGN PATENT DOCUMENTS

JP  2005-173970  6/2005

* cited by examiner

*Primary Examiner* — Melissa Koval
*Assistant Examiner* — Trung Nguyen
(74) *Attorney, Agent, or Firm* — Beyer Law Group LLP

(57) ABSTRACT

An input device includes a sensor member that detects input position information; and a protective member that protects the sensor member, wherein the protective member includes a window-shaped light-transmissive region transmitting light in the thickness direction, a transparent substrate having an input surface on a first surface, and a decorative layer disposed on a second first of the transparent substrate. The decorative layer is stacked on the transparent substrate so as to surround the light-transmissive region, and an inclined section is provided at the inner edge of the decorative layer; the transparent filler is stacked on the second surface of the transparent substrate to cover the light-transmissive region and the inclined section; and the sensor member and the protective member are bonded together with the adhesive layer disposed on the transparent filler and the decorative layer.

19 Claims, 9 Drawing Sheets

INPUT DEVICE AND METHOD OF PRODUCING INPUT APPARATUS

CLAIM OF PRIORITY

This application claims benefit of Japanese Patent Application No. 2010-235041 filed on Oct. 20, 2010, which is hereby incorporated by reference.

BACKGROUND OF THE INVENTION

1. Field of the Invention

The present invention relates to an input device and a method of producing an input device and, more specifically, relates to a thin input device in which bubbles do not form in a light-transmissive region.

2. Description of the Related Art

Today, light-transmissive input devices are used as display units in portable electronic apparatuses to allow an operator to input coordinates by directly operating menu items and objects of a display image with a finger. Such an input device is disposed over a display device in an electronic apparatus; therefore, the input device should be thin and having excellent visibility when a user views a display image on the display device.

FIG. 12 illustrates a known input device 101 described in Japanese Unexamined Patent Application Publication No. 2005-173970. The input device 101 includes an upper transmissive substrate 131 and a lower transmissive substrate 132 with a spacer 138 and a gap provided therebetween. An upper transparent conductive film 133 and a lower transparent conductive film 134 are respectively disposed on the opposing surfaces of the upper transmissive substrate 131 and lower transmissive substrate 132. The upper transmissive substrate 131 is a flexible film. Thus, the upper transparent conductive film 133 and the lower transparent conductive film 134 contact each other when a desired position on an input surface is pushed. The known input device 101 is a resistive touch panel, which reads a change in resistance to detect the input position coordinate.

An upper printing circuit 135 for connecting the upper transparent conductive film 133 with an external circuit is disposed on the periphery of upper transparent conductive film 133, and a lower printing circuit 136 is disposed on the periphery of the lower transparent conductive film 134. The upper printing circuit 135 and the lower printing circuit 136 are made of a conductive paste composed of a conductive metal filler, such as silver or copper. Since the input device 101 includes light-transmissive substrates, the upper printing circuit 135 and the lower printing circuit 136 are visible from the outside.

In the known input device 101 illustrated in FIG. 12, a decorative printing sheet 141a is attached to the input-surface side of the upper transmissive substrate 131 with an adhesive layer 151. A decorative printing layer 141b on the periphery of the decorative printing sheet 141a prevents the upper printing circuit 135 and the lower printing circuit 136 from being visible from the outside.

By providing the decorative printing sheet 141a, a frame, which is typically referred to as "bezel," covering the upper printing circuit 135 and the lower printing circuit 136 is no longer required. Therefore, the input-surface side of the frame of the input device 101 does not have an unlevel section, and thus, the external appearance can be improved. Since the decorative printing sheet 141a is thinner than the frame, the thickness of the input device 101 can be reduced.

SUMMARY OF THE INVENTION

FIG. 13 is a partially enlarged sectional view of the known input device 101 and illustrates a problem in the input device 101. In the known input device 101, a steep unlevel section 123 is formed due to the decorative printing layer 141b on the decorative printing sheet 141a. Having an unlevel section is undesirable for good external appearance because the decorative printing sheet 141a disposed on the input-surface side of the input device 101 is directly viewed from the outside. If the upper transmissive substrate 131 warps due to the influence of the unlevel section 123, problems, such as separation of the upper transmissive substrate 131 and reduction in reliability, occur. To compensate for the unlevel section at the decorative printing layer 141b, an adhesive layer 151, is made of a material that can satisfactorily compensate for the unlevel section, is provided to bond together the upper transmissive substrate 131 and the decorative printing sheet 141a; the thickness of the adhesive layer 151 needs to be at least three to five times of the thickness of the decorative printing layer 141b.

For example, if the decorative printing layer 141b has a thickness of approximately 15 µm, the adhesive layer 151 needs to have a thickness of approximately 50 µm. To suit the wide variety of electronic apparatuses, many input devices are provided with excellent designs by stacking a plurality of color layers on the decorative printing layer 141b. In such a case, the total thickness of the decorative printing layer 141b is at least 30 µm. To compensate for the unlevel section, the adhesive layer 151 requires a thickness of approximately 150 µm. Therefore, reducing the thickness of the adhesive layer 151 causes a great problem in reducing the thickness of the input device 101.

However, when the thickness of the adhesive layer 151 is reduced to reduce the thickness of the input device 101, bubbles form near the unlevel section 123 because the unlevel section 123 of the decorative printing layer 141b and the decorative printing sheet 141a is steep, as illustrated in FIG. 13. Since the inward area of the decorative printing layer 141b is a transmissive region, if bubbles form near the unlevel section 123, these bubbles will be directly visible by the operator, producing a poor external appearance. Even if bubbles do not form when the decorative printing sheet 141a and the upper transmissive substrate 131 are bonded, bubble formation at the unlevel section 123 and the separation of the adhesive layer 151 may be caused by reliability tests, such a high-temperature, high-humidity test, and/or aging. It has been difficult to prevent bubble formation in the transmissive region near the unlevel section 123 and reduce the thickness of the adhesive layer 151.

The known input device 101 illustrated in FIGS. 12 and 13 is a resistive touch panel in which two sensor substrates are disposed facing each other with a gap formed therebetween. The problems described above are an issue in not only the resistive touch panel but also in, for example, capacitance type, electromagnetic induction type, optical type, and other types of input devices.

As a solution of the problems described above, the present invention provides an input device and a method of producing an input device, which are capable of preventing bubble formation in a transmissive region near an unlevel section at a decorative layer and reducing the thickness of the adhesive layer.

An input device according to the present invention includes a sensor member configured to detect input position information; and a protective member configured to protect the sensor member, wherein the sensor member and the protective member are stacked on each other with an adhesive layer transmitting visible light and a transparent filler transmitting visible light interposed between the sensor member and the protective member, the protective member includes a window-shaped light-transmissive region transmitting light in a thickness direction, a transparent substrate having a first surface constituting an input surface to be operated for input, and a decorative layer disposed on a second first of the transparent substrate, the decorative layer is stacked on the transparent substrate and surrounds the light-transmissive region, an inner edge of the decorative layer having an inclined section tapered toward an inner area of the light-transmissive region, the transparent filler is stacked on the second surface of the transparent substrate to cover the light-transmissive region and the inclined section, and the sensor member and the protective member are bonded together with the adhesive layer disposed on the transparent filler and the decorative layer.

With the input device according to the present invention, by providing an inclined section on the inner edge of the decorative layer, the unlevel section formed by the decorative layer and the transparent substrate has gradual inclination, and a steep unlevel section is not formed. In this way, bubble formation in the light-transmissive region near the unlevel section is prevented.

With the input device according to the present invention, the transparent filler is stacked on the second surface of the transparent substrate to cover the light-transmissive region and the inclined section, and the sensor member and the protective member are bonded together with the adhesive layer disposed on the transparent filler and the decorative layer. In this way, the influence of the unlevel sections at the decorative layer can be reduced; thus, the thickness of the adhesive layer bonding the protective member and the sensor member together can be reduced, reducing the thickness of the input device.

In the input device according to the present invention, it is preferable that an inclination angle of the inclined section and the second surface of the transparent substrate be in a range of 3° to 60°. By providing the inclined section with an inclination angle in a range of 3° to 60°, bubble formation in the light-transmissive region near the unlevel section formed by the decorative layer and the transparent substrate can be reliably prevented. Moreover, the thickness of the transparent filler can be satisfactorily controlled, and the influence of the unlevel sections at the decorative layer can be reduced. Moreover, the masking effect of the decorative layer is satisfactory.

In the input device according to the present invention, it is even more preferable that an inclination angle of the inclined section and the second surface of the transparent substrate be in a range of 5° to 60°. In this way, bubble formation in the light-transmissive region near the unlevel section formed by the decorative layer and the transparent substrate can be reliably prevented, and the thickness of the transparent filler can be controlled even more satisfactorily; thus, the influence of the unlevel sections at the decorative layer can be reduced even more. Moreover, the masking effect of the decorative layer is very good.

In the input device according to the present invention, it is even more preferable that an inclination angle of the inclined section and the second surface of the transparent substrate be in a range of 30° to 60°. In this way, bubble formation in the light-transmissive region near the unlevel section formed by the decorative layer and the transparent substrate can be prevented, and the thickness of the transparent filler can be controlled excellently; thus, the influence of the unlevel sections at the decorative layer can be reduced even more. Moreover, the masking effect of the decorative layer is excellent.

It is preferable that the transparent filler be a resin transmitting visible light. In this way, good visibility is ensured for the operator, and the thickness of the transparent filler can be satisfactorily controlled.

It is suitable that the transparent filler be an ultraviolet curable resin. In this way, the transparent filler can be easily applied and cured, and the influence of residual stress when the transparent filler is cured is small.

In the input device according to the present invention, the sensor member may be a capacitance tough sensor. In this way, bubbles do not form in the light-transmissive region when viewed from outside, and a thin capacitance touch panel can be provided.

The sensor member may be a resistive tough sensor. In this way, bubbles do not form in the light-transmissive region when viewed from outside, and a thin resistive touch panel can be provided.

In the input device according to the present invention, the sensor member may include a sensor substrate having an electrode pattern configured to detect input position information, and a wiring patter disposed on the periphery of the electrode pattern, a surface of the sensor substrate opposing the protective member may constitute a depression due to the electrode pattern and the wire pattern, the transparent filler and the decorative layer on the transparent substrate may constitute a protrusion, and the protective member and the sensor member may be stacked on each other by engaging the depression and the protrusion. In this way, since the transparent filler and the decorative layer constitute a protrusion, the influence of the depression of the sensor substrate is compensated for, and a thin and flat input device can be provided.

A method of producing an input device according to the present invention includes the steps of: a) forming a decorative layer on a second surface of a transparent substrate having a first surface constituting an input surface and a window-shaped light-transmissive region surrounded by the decorative layer and forming an inclined section tapered toward an inner area of the light-transmissive region at an inner edge of the decorative layer; b) applying a transmissive filler in the light-transmissive region of the transparent substrate with a gap formed between the transparent substrate and the decorative layer; c) closely adhering the transparent filler with the light-transmissive region of the transparent substrate and the inclined section by holding the transparent substrate with the applied transparent filler so as to level the transparent filler having fluidity; d) curing the transparent filler; and e) bonding at least part of the sensor member configured to detect input position information and the transparent substrate by applying an adhesive layer on the transparent filler and the decorative layer.

In this way, by providing the inclined section at the inner edge of the decorative layer in Step a and then leveling the transparent filler applied in Step b by holding it for a predetermined amount of time in Step c, the transparent filler spreads across the surfaces of the light-transmissive region and the inclined section. Through such steps, bubble formation in the light-transmissive region near the unlevel sections at the decorative layer can be prevented. Since the influence of the unlevel sections at the decorative layer can be reduced by applying the transparent filler, and the thickness of the decorative layer provided in Step e can be reduced, a thin input device can be produced.

With the method of producing an input device according to the present invention, it is preferable that, in step a, an inclination angle of the inclined section and the second surface of the transparent member be in a range of 3° to 60°. In this way, the thickness of the decorative layer can be precisely controlled. In Step c of leveling the transparent filler, bubble formation in the light-transmissive region near the unlevel sections of the decorative layer can be reliably prevented, and the thickness of the transparent filler can be precisely controlled.

With the method of producing an input device according to the present invention, it is preferable that, in step a, an inclination angle of the inclined section and the second surface of the transparent member be in a range of 5° to 60°. In this way, the thickness of the decorative layer can be even more precisely controlled. In Step c of leveling the transparent filler, bubble formation in the light-transmissive region near the unlevel sections of the decorative layer can be reliably prevented, and the thickness of the transparent filler can be even more precisely controlled.

With the method of producing an input device according to the present invention, it is preferable that, in step a, an inclination angle of the inclined section and the second surface of the transparent member be in a range of 30° to 60°. In this way, the thickness of the decorative layer can be controlled extremely precisely. In Step c of leveling the transparent filler, bubble formation in the light-transmissive region near the unlevel sections of the decorative layer can be reliably prevented, and the thickness of the transparent filler can be controlled extremely precisely.

It is preferable that, in step b, the transparent filler be a transparent resin. In this way, an input device providing good visibility to the operator can be easily produced.

It is preferable that, in step b, the transparent filler be applied by a printing method. In this way, the transparent filler can be easily applied by a printing method, such as screen printing or ink-jet printing.

It is preferable that, in step d, the transparent filler be cured by irradiating the transparent filler with ultraviolet rays. In this way, since curing at normal temperature is possible, without applying heat, an input device can be produced in a shorter amount of time at lower cost.

It is preferable that, in Step e, the sensor member be a capacitance tough sensor. In this way, a thin capacitance touch panel without bubbles in the light-transmissive region when viewed from the outside can be produced.

It is preferable that, in Step e, the sensor member be a resistive tough sensor. In this way, a thin resistive touch panel without bubbles in the light-transmissive region when viewed from the outside can be produced.

DESCRIPTION OF THE PREFERRED EMBODIMENTS

First Embodiment

Figure 1:
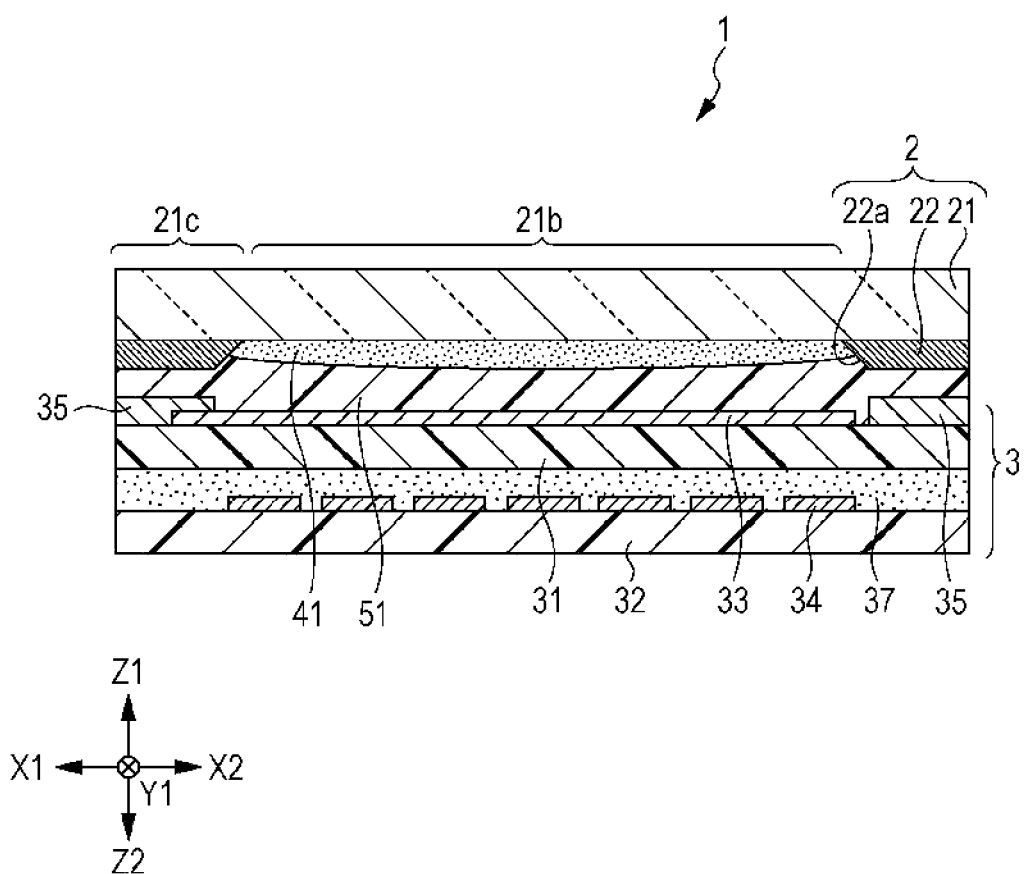
FIG. 1 is a sectional view of an input device according to a first embodiment of the present invention.

FIG. 1 is a sectional view of an input device 1 according to a first embodiment of the present invention. The input device 1 is mounted on a display unit in any electronic apparatus among a variety of electronic apparatuses, such as mobile phones and portable information terminals, such that the input device 1 covers the display screen of a display device, such as a liquid crystal panel. An operator can visibly confirm images on the display device through the input device 1 and can perform input operation by directly touching the display screen.

As illustrated in FIG. 1, the input device 1 includes a sensor member 3 configured to detect input position information and a protective member configured to protect the surface of the sensor member 3. The sensor member 3 and the protective member 2 are bonded together with a transparent filler 41 and an adhesive layer 51 interposed therebetween.

The sensor member 3 is a capacitance touch sensor configured to detect input position information by a change in capacitance. The sensor member 3 includes a first sensor substrate 31 having a first electrode pattern 33 on the surface thereof and a second sensor substrate 32 having a second electrode pattern 34 on the surface thereof. The first electrode pattern 33 includes electrodes, each of which extends in the X1-X2 direction on the X-Y plane on the surface of the first sensor substrate 31. The second electrode pattern 34 includes electrodes, each of which extends in the Y1-Y2 direction on the X-Y plane on the surface of the second sensor substrate 32. The first sensor substrate 31 and the second sensor substrate 32 are bonded together with an adhesive layer 37 such that there is a capacitance between the first electrode patter 33 and the second electrode pattern 34. With such a configuration, a change in capacitance occurs when carrying out input operation by moving a finger close to or into contact with the input surface; input position information can be detected on the basis of this change in capacitance.

The first electrode pattern 33 and the second electrode pattern 34 are transparent conductive films, which are made of, for example, indium tin oxide (ITO), SnO2, or ZnO, are light-transmissive in the visible light range, and are formed by sputtering or deposition. The thickness of the electrode patterns 33 and 34 is in the range of 0.01 to 0.05 μm, e.g., approximately 0.02 μm. In addition to sputtering and deposition, the electrode patterns 33 and 34 may be produced by transferring a transparent conductive film, which is provided in advance on a film material, onto a substrate or by applying liquid materials onto the substrate.

A first wiring patter 35 is disposed on the periphery of the first electrode pattern 33 of the first sensor substrate 31. The first wiring pattern 35 is connected to an external circuit so as to transmit input signals from the input device 1 to the external circuit. The first wiring pattern 35 includes a wiring circuit (not shown) connected to external devices and connective electrodes (not shown) connecting the wiring circuit and the first electrode pattern 33. A second wiring pattern 36 (not shown) is disposed on the periphery of the second electrode pattern 34 of the second sensor substrate. The first wiring pattern 35 and the second wiring pattern 36 are formed by printing a conductive paste containing a conductive material, such as copper or silver. Instead, the first wiring pattern 35 and the second wiring pattern 36 may be formed as thin films by sputtering or deposition, in a manner similar to that of the first electrode pattern 34 and the second electrode pattern 35.

The first sensor substrate 31 and the second sensor substrate 32 are films made of a transparent resin, such as polyethylene terephthalate (PET). The thickness of the first sensor substrate 31 and the second sensor substrate 32 is set in the range of 100 to 200 μm, e.g., approximately 120 μm. The adhesive layer 37, which bonds together the first sensor substrate 31 and the second sensor substrate 32, is a light-transmissive acrylic-resin based adhesive tape with a thickness in the range of approximately 10 to 50 μm, e.g., 25 μm.

Thus, the total thickness of the sensor member 3 is the sum of the thicknesses of the components and is in the range of approximately 200 to 300 μm.

As illustrated in FIG. 1, the protective member 2, which protects the sensor member 3, is stacked on the input-surface side of the sensor member 3. Since the protective member 2, protecting the sensor member 3, is disposed on the display unit of the electronic apparatus, it is directly visible by the operator. Thus, the protective member 2 should have an excellent external appearance.

The protective member 2 includes a transparent substrate 21 and a decorative layer 22. The transparent substrate 21 is a glass substrate or a plastic substrate, which transmits visible light. Compared to a resin substrate, a glass substrate has excellent visibility because it has excellent optical characteristics. A plastic substrate can be worked into a desired shape relatively easily by molding.

The decorative layer 22 is stacked on the surface of the transparent substrate 21 opposing the sensor member 3. The decorative layer 22 is disposed on the periphery of the transparent substrate 21 such that it covers the first wiring pattern 35 and the second wiring pattern 36 (not shown) in plan view. In this way, when the input device 1 is viewed from the outside, the first wiring pattern 35 and the second wiring pattern 36 are not visible by the operator because they are masked by the decorative layer 22. Since the protective member 2 constitutes the display unit of the electronic apparatus, the decorative layer 22 masks the first wiring pattern 35 and the second wiring pattern 36 and is incorporated into the overall design of the electronic apparatus by being decorated with patterns, characters, marks, graphics, colors, etc.

The decorative layer 22 may be formed by a printing method, such as screen printing, ink-jet printing, photogravure printing, or offset printing, a transfer method, or deposition. Instead, the decorative layer 22 may be formed by glass insert molding, in-mold molding, or double injection molding. When the decorative layer 22 is stacked using a molding method, the transparent substrate 21 and the decorative layer 22 can be shaped relatively freely. However, when employing a molding method, each design requires an individual mold, increasing the cost when a large variety of molds in small quantities is to be produced. With the input device 1 according to this embodiment, the decorative layer 22 is produced by a printing method that enables relatively inexpensive and easy production of the decorative layer 22. The thickness of the decorative layer 22 is in the range of approximately 0.01 to 100 μm. For example, for printing a single black layer, the thickness is in the range of approximately 8 to 15 μm. For printing white or light color layers, at least two or three layers must be printed over each other to achieve a sufficient masking effect of the decorative layer 22, and in such a case, the thickness will be in the range of approximately 15 to 30 μm.

Figure 2:
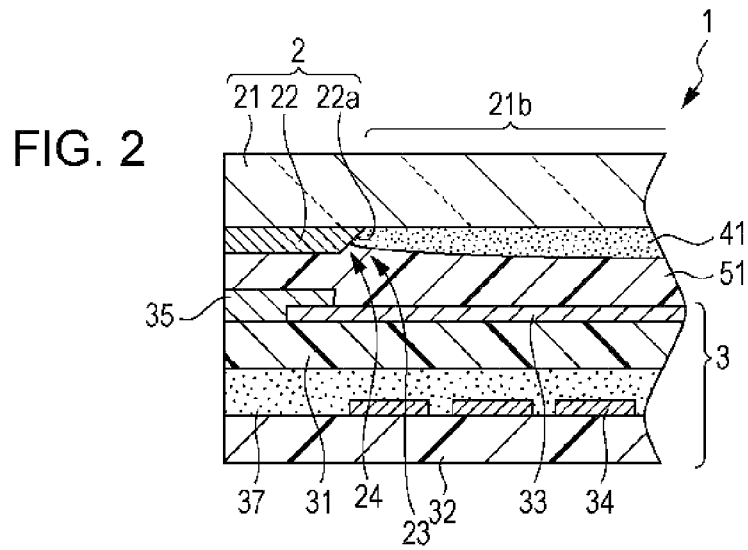
FIG. 2 is a partially enlarged sectional view of the input device according to the first embodiment of the present invention.

FIG. 2 is a partially enlarged sectional view of the input device 1 according to the first embodiment. As illustrated in FIGS. 1 and 2, in the input device 1 according to the present invention, an inclined section 22a, where the decorative layer 22 is tapered toward the inner area of a light-transmissive region 21b, is provided on the inner edge of the decorative layer 22. The transparent filler 41 is stacked on the light-transmissive region 21b of the transparent substrate 21 and part of the inclined section 22a. The protective member 2 and the sensor member 3 are bonded together with the adhesive layer 51 along the transparent filler 41 and the decorative layer 22. With such a configuration, bubble formation in the light-transmissive region 21b near an unlevel section 23 formed by the decorative layer 22 and the transparent substrate 21 can be prevented, and the thickness of the input device 1 can be reduced by reducing the thickness of the adhesive layer 51.

That is, by providing the inclined section 22a, the unlevel section formed by the transparent substrate 21 and the decorative layer 22 becomes less steep. Thus, the transparent filler 41 can be tightly bonded to part of the transparent substrate 21 and inclined section 22a. In this way, bubble formation in the light-transmissive region 21b near the unlevel section 23 can be prevented. For example, if the inclined section 22a is not provided, the unlevel section 23 formed by the decorative layer 22 and the transparent substrate 21 will be steep, causing bubbles to easily form near the unlevel section 23 when the transparent filler 41 is stacked. Since the inward area of the decorative layer 22 is the light-transmissive region 21b, if bubbles form near the unlevel section 23, these bubbles will be visible from outside, providing an unsatisfactory external appearance. Bubbles that are formed at the edge of the light-transmissive region 21b reduce the visibility of the images displayed on the image display device, which is a liquid crystal panel disposed below the input device 1.

The transparent filler 41 may be a resin that transmits visible light, e.g., acrylic resin. The transparent filler 41 can be provided easily using a printing method, such as screen printing or ink-jet printing, with pastes, including acrylic resin, or ink. When a glass substrate is used as the transparent substrate 21, wettability of the ink and the glass surface is good. Therefore, the transparent substrate 21 and the transparent filler 41 can be tightly stacked without bubbles forming therebetween, and excellent visibility can be achieved. By selecting ink with desirable viscosity and setting appropriate printing conditions, the transparent filler 41 can be provided with a desirable thickness and shape.

It is desirable to use a UV curable resin for the transparent filler 41. A UV curable resin cures in a short amount of time because heating is not required. By using a UV curable resin, bubbles and pinholes do not form at the boundary of the transparent filler 41 and the transparent substrate 21 or inclined section 22a because temperature change and value reduction are small during curing. The transparent substrate 21 does not warp when the transparent filler 41 is stacked thereon because the residual stress of the UV curable resin is small during curing.

The adhesive layer 51, which bonds together the protective member 2 and the sensor member 3, may be a light-transmissive adhesive tape made of acrylic resin, etc. The viscoelasticity of the adhesive layer 51, which bonds together the protective member 2 and the sensor member 3, should be suitable for compensating for and flattening the unlevel section formed at the members.

Figure 12:
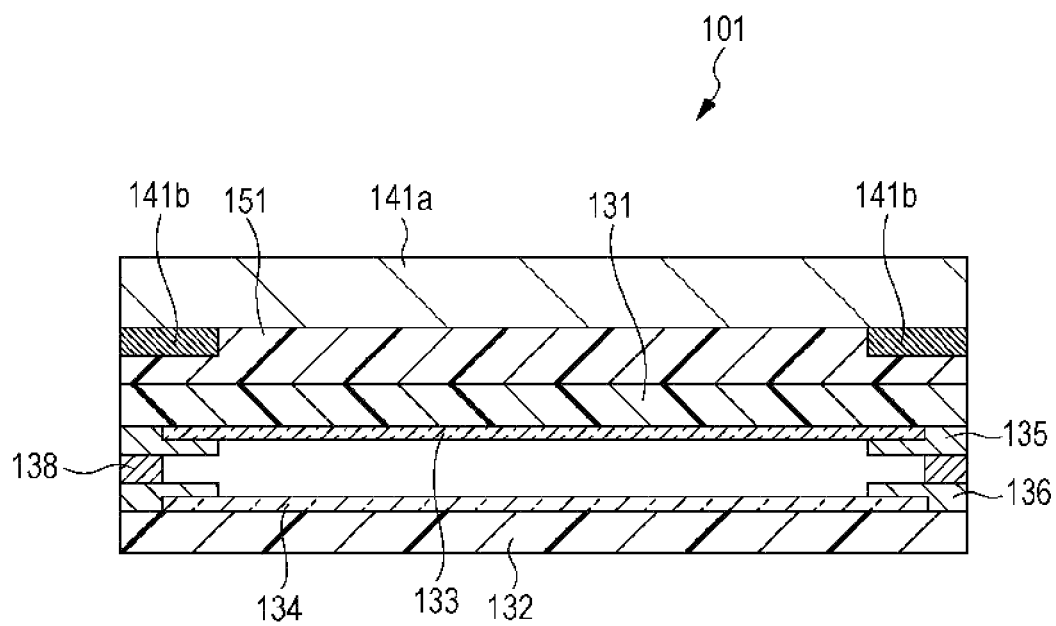
FIG. 12 is a sectional view of a known input device.
Figure 13:
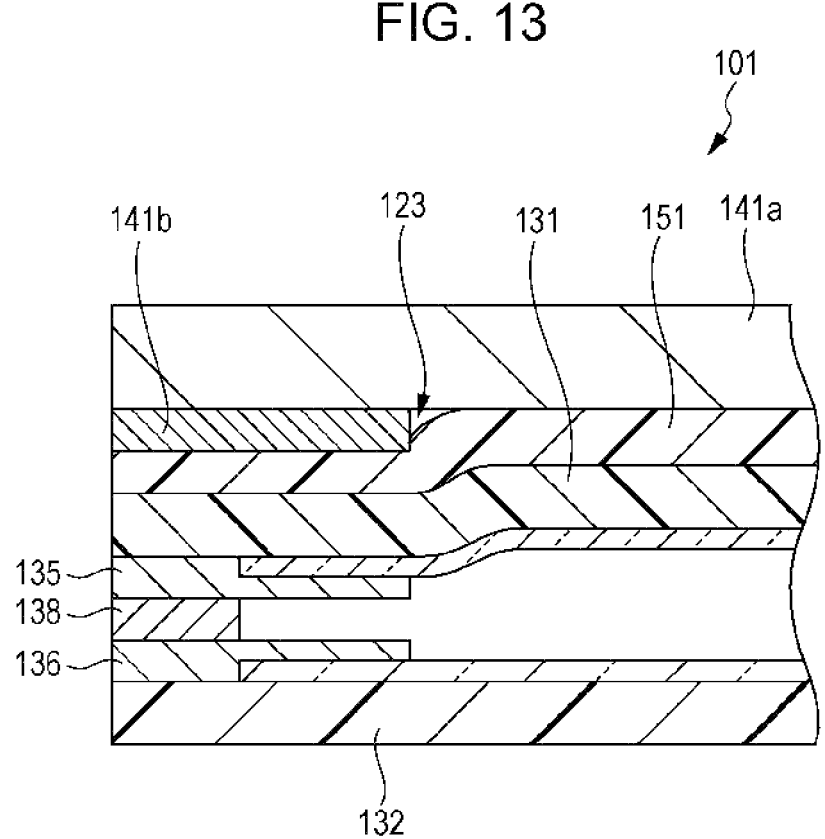
FIG. 13 is a partially enlarged sectional view of an unlevel section at a decorative printing layer of the known input device.

To clarify the advantages of the present invention, the present invention will be described below in comparison with a known input device. In the known input device 101 illustrated in FIGS. 12 and 13, the adhesive layer 151 having a thickness that is at least three to five times of the thickness of the decorative printing layer 141b is provided to compensate for the unlevel section at the decorative printing layer 141b. Therefore, when the decorative printing layer 141b is formed by single layer printing, the thickness of the adhesive layer 151 is approximately 50 μm, and when the decorative printing layer 141b is formed by multilayer printing, the thickness of the adhesive layer 151 is increased to approximately 150 μm to compensate for the unlevel section. Since the thickness of the capacitance touch sensor is in the range of approximately 200 to 300 μm, as described above, reducing the thickness of the adhesive layer 151 is a large problem in reducing the thickness of the input device 101.

Bubble formation may be prevented by compensating for the unlevel section at the decorative printing layer 141b with the adhesive layer 151 made of a soft and thin material having low viscoelasticity. However, a material with low viscoelasticity is difficult to cut into a desired shape and performing punching because the workability of such a material is extremely low. Other problems that may occur when a material with low viscoelasticity is used include weak adhesive power and a poor external appearance due to the adhesive layer 151 protruding from the periphery of the decorative printing sheet 141a and being visible by the operator.

As illustrated in FIG. 2, with the input device 1 according to the present invention, since the transparent filler 41 is provided on light-transmissive area 21b of the transparent substrate 21 and part of the inclined section 22a, the influence of the unlevel sections at the decorative layer 22 is significantly reduced. Therefore, the adhesive layer 51 only has to compensate for an unlevel section 24 formed by the decorative layer 22 and the transparent filler 41, and the thickness of the adhesive layer 51 can be significantly reduced. For example, if the transparent filler 41 is provided such that the size of the unlevel section 24 is set in the range of approximately ½ to ⅓ of the thickness of the decorative layer 22, the thickness of the adhesive layer 51 can be reduced by at least ½. With the known input device 101, since the adhesive layer 151 should satisfactorily compensate for the unlevel section, a material with low viscoelasticity has to be used. Consequently, the material of the adhesive layer 151 has to be selected from small variety of relatively expensive materials. With the present invention, the material of the adhesive layer 51 can be selected from a large variety of relatively inexpensive materials.

The unlevel section becomes less steep by forming the inclined section 22a in the decorative layer 22 and the influence of the unlevel section is reduced by stacking the transparent filler 41 thereon; accordingly, the members can be tightly bonded, and adhesive stress can be reduced. Therefore, even when aging occurs and/or reliability tests, such as a high-temperature, high-humidity test, are performed, bubble formation and separation of the adhesive layer 51 and/or the transparent filler 41 can be prevented.

Cases in which the inclined section 22a of the decorative layer 22 has different inclination angles will be described below. The dimensions and inclination angles of the components in the drawings are modified appropriately for descriptional purposes.

Figure 5A:
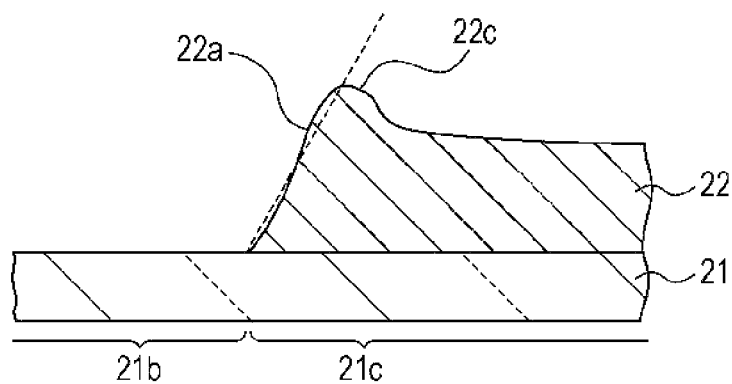
FIGS. 5A to 5C are partially enlarged sectional views of a transparent substrate and a decorative layer in an input device according to the present invention.
Figure 5B:
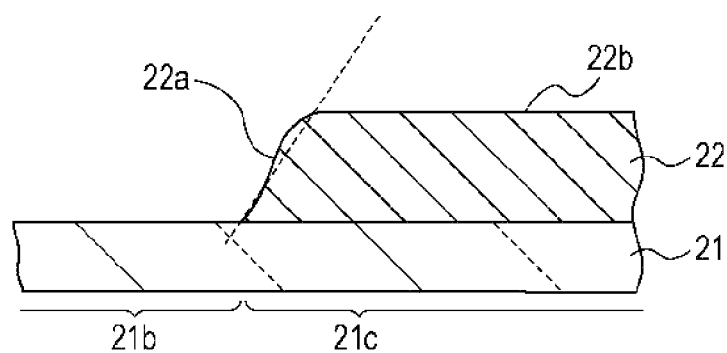
Figure 5C:
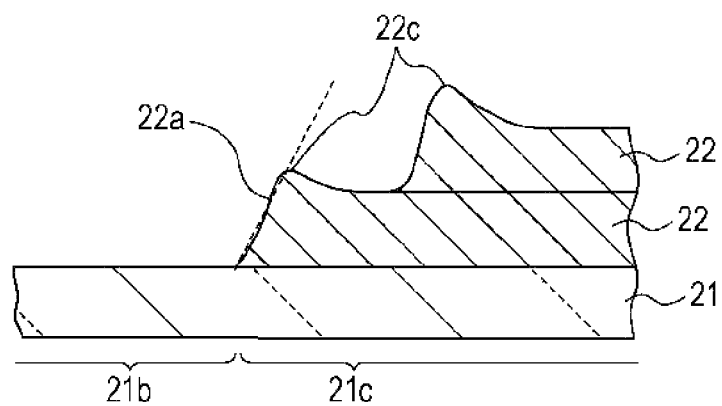

FIGS. 5A to 5B are partially enlarged sectional views of the transparent substrate 21 and the decorative layer 22 when the decorative layer 22 is formed using a printing method. In FIGS. 5A to 5C, the input surface is illustrated at the bottom. When the decorative layer 22 is formed using a printing method, the cross-section of the inclined section 22a of the decorative layer 22 is not straight due to the viscoelasticity of ink. The cross-sections may take various different forms in which protruding parts 22c illustrated in FIGS. 5A and 5C are formed or the decorative layer 22 forming a gradual curve connecting to a main surface 22b of the decorative layer 22, as illustrated in FIG. 5B. In this embodiment, the inclination angle of the inclined section 22a is not the contact angle of the decorative layer 22 and the transparent substrate 21 but is determined by approximating the curve at the inclination surface of the inclined section 22a to a straight line, as indicated by the dotted lines in FIGS. 5A to 5C, and determining the average inclination angle. For example, when the decorative layer 22 has a protruding part 22c, as illustrated in FIG. 5A, the inclination angle is determined by the straight line connecting a contact point of the inclined section 22a and the transparent substrate 21 (a point on the inner edge of the decorative layer 22) and the apex of the protruding parts 22c. When the decorative layer 22 does not have a protruding part 22c, as illustrated in FIG. 5B, the inclination angle is determined by the straight line extending from the boundary of the inclined section 22a and the main surface 22b of the decorative layer 22 (the plane substantially parallel to the surface of the transparent substrate 21) to the contact point of the inclined section 22a and the transparent substrate 21. When multiple layers are provided by decorative printing, the inclination angle is determined by the inclined section 22a of the first layer (the layer stacked directly on the transparent substrate 21).

FIG. 2 is a partially enlarged sectional view of the input device 1 according to the first embodiment and illustrates a case in which the inclination angle of the decorative layer 22 is set in the range of 30° to 60°, e.g., 45°. By providing the decorative layer 22 and the transparent filler 41 in the input device 1 according to this embodiment, two unlevel sections, i.e., the unlevel section 23 formed by the transparent substrate 21 and the decorative layer 22 and the unlevel section 24 formed by the transparent filler 41 and the decorative layer 22, are formed. Therefore, bubbles might form when the transparent filler 41 is stacked and when the adhesive layer 51 is bonded. However, bubble formation is prevented in the input device 1 according to this embodiment because the unlevel section 23 formed by the transparent substrate 21 and the decorative layer 22 has a gradual angle, enabling the transparent filler 41 to be closely bonded to the transparent substrate 21 and the decorative layer 22. Moreover, since the unlevel section 24 formed by the transparent filler 41 and the decorative layer 22 is small enough that the adhesive layer 51 can compensate for the unlevel section 24, bubbles do not form. Even if bubbles form at the unlevel section 24, the bubbles are not directly visible by the operator because they are masked by the decorative layer 22.

When the inclination angle is set in the range of 30° to 60°, e.g., 45°, the thickness of the decorative layer 22 and the transparent filler 41 can be precisely controlled. Since the thickness of the transparent filler 41 can be precisely controlled, the influence of the unlevel sections at the decorative layer 22 can be significantly reduced, and accordingly, the thickness of the adhesive layer 51 can be reduced. Since the thickness of the decorative layer 22 can be precisely controlled, the masking effect of the decorative layer 22 is excellent, masking the first wiring pattern 35 and the second wiring pattern 36 (not shown) from outside and achieving excellent visibility.

Figure 3:
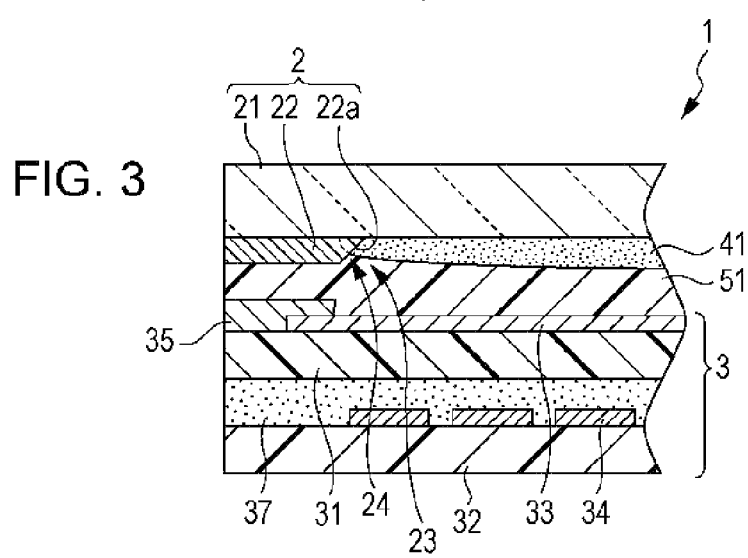
FIG. 3 is a partially enlarged sectional view of a variation of the input device according to the first embodiment.

FIG. 3 is a partially enlarged sectional view of a variation of the input device 1 according to the first embodiment and illustrates a case in which the inclination angle is in the range of 5° to 30°, e.g., 10°. When the decorative layer 22 is provided with such an inclination angle, the angle of the unlevel section 23 formed by the transparent substrate 21 and the decorative layer 22 is extremely gradual. Therefore, the transparent filler 41 can be bonded to the transparent substrate 21 and the inclined section 22a, preventing bubble formation near the unlevel section 23. When the inclination angle is set in the range of 5° to 30°, e.g., 10°, the applied transparent filler 41 easily spreads across the surface of the inclined section 22a due to the fluidity thereof, and the angle of the unlevel section 24 formed by the transparent filler 41 and the decorative layer 22 becomes gradual, preventing bubble formation. Since the influence of the unlevel section 24 is reduced, the thickness of the adhesive layer 51 can be reduced. The thickness of the decorative layer 22 can be precisely controlled, and a sufficient masking effect can be achieved.

Figure 4:
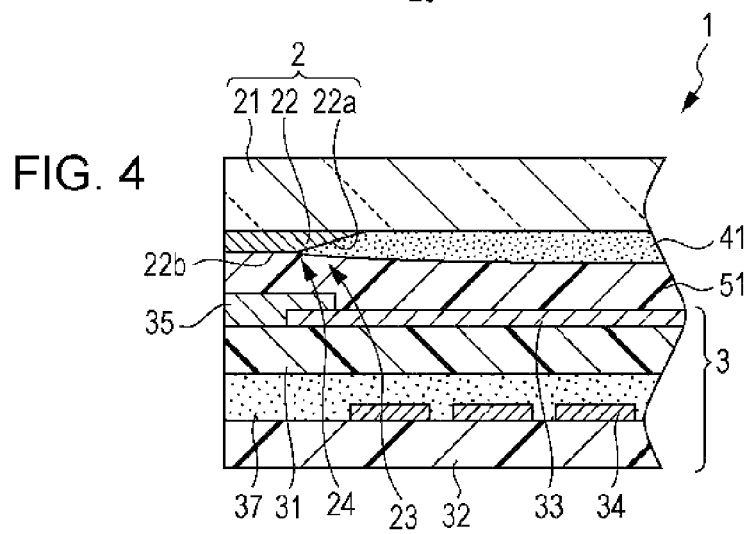
FIG. 4 is a partially enlarged sectional view of another variation of the input device according to the first embodiment.

FIG. 4 is a partially enlarged sectional view of a variation of the input device 1 according to the first embodiment and illustrates a case in which the inclination angle is in the range of 3° to 5°. In this variation, the unlevel section 23 formed by the transparent substrate 21 and the decorative layer 22 has a very gradual angle; therefore, the transparent filler 41 bonded extremely closely to the transparent substrate 21 and the inclined section 22a, preventing bubble formation near the unlevel section 23. The applied transparent filler 41 easily spreads on the inclined section 22a due to the fluidity thereof, and the unlevel section 24 is formed by the transparent filler 41 running onto the flat main surface 22b of the decorative layer 22. The resulting transparent filler 41 protrudes with respect to the decorative layer 22. The unlevel section 24 has a gradual angle, preventing bubble formation. Even if bubbles form at the unlevel section 24, the bubbles do not affect the external appearance because they are masked by the decorative layer 22. The thickness of the decorative layer 22 can be precisely controlled, and the masking effect of the decorative layer 22 is satisfactory. The transparent filler 41 may be stacked on the main surface 22b of the decorative layer 22. In such a case, bubbles are not formed near the unlevel section 23, and since the influence of the unlevel sections of the decorative layer 22 is decreased, the thickness of the adhesive layer 51 can be reduced.

It is undesirable to set the inclination angle smaller than 3° because the masking effect of the decorative layer 22 will be reduced. The transparent filler 41 will be thicker than the decorative layer 22 and will protrude with respect to the decorative layer 22; accordingly, the thickness cannot be precisely controlled. It is undesirable to set the inclination angle larger than 60° because, although the thicknesses of the decorative layer 22 and the transparent filler 41 can be precisely controlled, the angles of the unlevel section 23 formed by the decorative layer 22 and the decorative layer 22 and the unlevel section 24 formed by the decorative layer 22 and the transparent filler 41 become sharp, and bubbles may form.

Table 1 lists, for different inclination angles, the evaluation results of the controllability of the applied film thickness and the controllability of the bubble formation.

TABLE 1

| Decorative layer inclination angle | Overall evaluation | Controllability of transparent filler thickness | Masking effect of decorative layer | Controllability of bubble formation in unlevel section 23 | Controllability of bubble formation in unlevel section 24 |
| --- | --- | --- | --- | --- | --- |
| ~3° | Δ | Δ | Δ | ◎ | Δ |
| 3°~5° | ○ | ○ | ○ | ◎ | ○ |
| 5°~30° | ◎ | ○ | ○ | ◎ | ◎ |
| 30°~60° | ◎ | ◎ | ◎ | ○ | ○ |
| 60°~90° | Δ | ◎ | ◎ | Δ | Δ |

Figure 6:
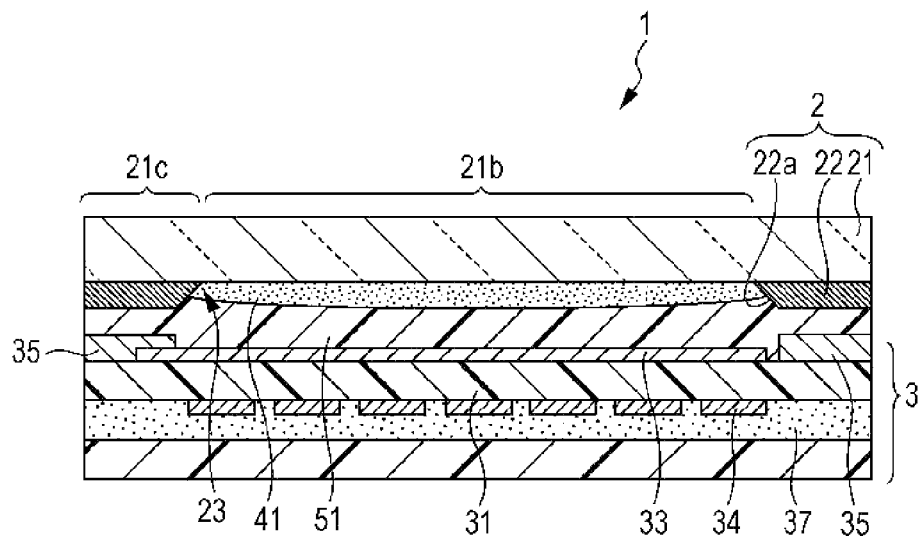
FIG. 6 is a partially enlarged sectional view of another variation of the input device according to the first embodiment.

FIG. 6 is a sectional view of a variation of the input device 1 according to the first embodiment. In this variation illustrated in FIG. 6, the first electrode pattern 33 and the second electrode pattern 34 are provided respectively on the front and back surfaces of the first sensor substrate 31. In such a case, a capacitance is formed between the first electrode pattern 33 and the second electrode pattern 34, and input position information can be detected by a change in the capacitance. When a capacitance touch sensor has a single sensor substrate, as in this variation, the thickness of the sensor member 3 can be reduced, compared with the thickness of a sensor member having two sensor substrates.

The input device 1 according to this variation achieves the same advantages of the present invention, and bubble formation at the unlevel section 23 formed by the decorative layer 22 and the transparent substrate 21 can be prevented. Since the influence of the unlevel sections at the decorative layer 22 is reduced, the thickness of the adhesive layer 51, which bonds together the protective member 2 and the sensor member 3, can be reduced. Since the sensor member 3 in this variation is thin, the thickness of the adhesive layer 51 can be reduced, contributing an effective reduction of thickness of the input device 1.

Second Embodiment

Figure 7:
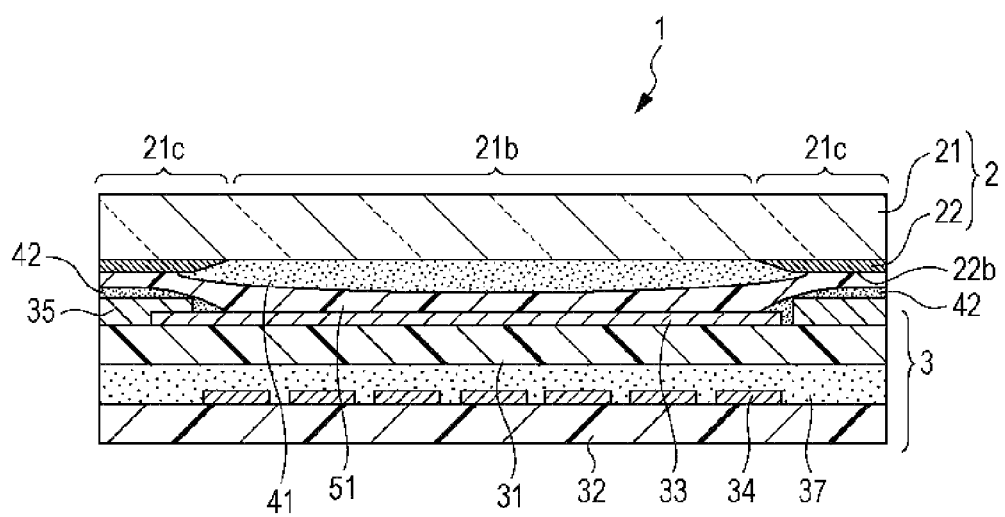
FIG. 7 is a sectional view of an input device according to a second embodiment.

FIG. 7 is a sectional view of an input device 1 according to a second embodiment. In the input device 1 of the second embodiment, similar to that of the first embodiment, a protective member 2 and a sensor member 3 are bonded together with a transparent filler 41 and an adhesive layer 51 disposed therebetween, and the sensor member 3 constitutes a capacitance touch sensor.

In the second embodiment, a first wiring pattern 35 is disposed on the periphery of the first sensor substrate 31, and a protective layer 42 covers the top of the first wiring pattern 35. In the input device 1, to increase a light-transmissive region 21b, the first wiring pattern 35 has fine wiring such that a non-transmissive region 21c is decreased. Therefore, the protective layer 42 is provided on the first wiring pattern 35 to prevent wire breaking and short-circuiting. The protective layer 42 is made of the same resin as the transparent filler 41 using a printing method, such as screen printing or ink-jet printing. The thickness of the first electrode pattern 33 is smaller than the total thickness of the first wiring pattern 35 and the protective layer 42; therefore, the entire upper surface of the sensor member 3 has depressed cross-section, as illustrated in FIG. 7.

In contrast, the transparent filler 41 stacked on the transparent substrate 21 of the protective member 2 overlaps with the light-transmissive region 21b and a main surface 22b of a decorative layer 22. The transparent filler 41 is thicker than the decorative layer 22. Therefore, the decorative layer 22 and the transparent filler 41, as a whole, has a cross-section protruding toward the sensor member 3.

The input device 1 of the second embodiment is integrated into a single unit by engaging the protrusion of the transparent filler 41 stacked on the transparent substrate 21 and the depression of the upper surface of the sensor member 3 and bonding these together with an adhesive layer 51. In this way, the protective member 2 and the sensor member 3 are bonded together into a flat plate. By engaging the protrusion of the protective member 2 and the depression of the sensor member 3, the influences of the unlevel sections at the surfaces of the protective member 2 and the sensor member 3 are cancelled out. Consequently, the unlevel sections do not need to be compensated for by the adhesive layer 51, and the thickness of the adhesive layer 51 can be reduced. Since the transparent filler 41 and the protective layer 42 are disposed such that steep unlevel sections are not formed, bubbles do not form at the unlevel sections.

Third Embodiment

Figure 8:
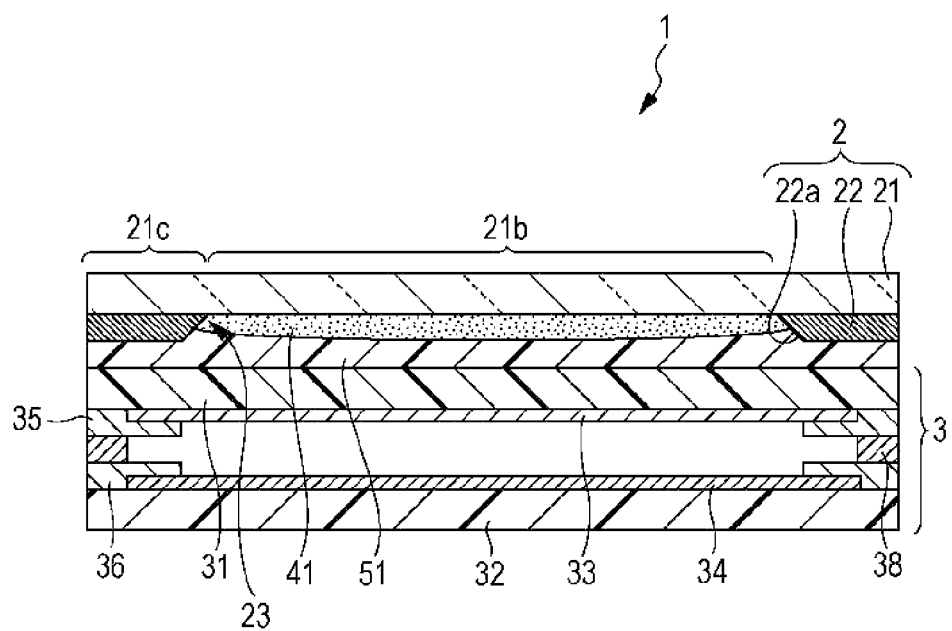
FIG. 8 is a sectional view of an input device according to a third embodiment.

FIG. 8 is a sectional view of an input device 1 according to a third embodiment. As illustrated in FIG. 8, a sensor member 3 in the third embodiment constitutes a resistive touch sensor. In the sensor member 3 in this embodiment, a first sensor substrate 31 and a second sensor substrate 32 oppose each other with a spacer 38 interposed therebetween. A first electrode pattern 33 and a second electrode pattern 34 are respectively disposed on the opposing surfaces of the first sensor substrate 31 and the second sensor substrate 32.

The first sensor substrate 31 disposed on the input-surface side is made of a flexible film of a transparent resin, such as polyethylene terephthalate (PET), and is deformable in response to input operation. The thickness of the first sensor substrate 31 is in the range of approximately 100 to 200 µm, e.g., 188 µm. The second sensor substrate 32 is made of transparent resin, such as polycarbonate (PC), polyethylene terephthalate (PET), polyether sulphone (PES), methyl methacrylate resin (PMMA), or norbornene resin, and has a thickness in the range of 0.5 to 1.5 mm, e.g., approximately 1.0 mm.

In the resistive touch sensor, when the first sensor substrate 31 bends due to push operation, the second sensor substrate 32 and the second electrode pattern 34 contact each other at the point where the first sensor substrate 31 is pushed. Voltages applied to the first electrode pattern 33 and the second electrode pattern 34, and input position information can be detected by a change in the voltage values in response to the push operation.

Since the protective member 2 is stacked on the input-surface side of the sensor member 3, the transparent substrate 21 should be made of a flexible material that is deformable in response to input operation. The transparent substrate 21 may be made of a film of transparent resin, such as polyethylene terephthalate (PET).

A decorative layer 22 is disposed on the peripheral edge of the surface of the transparent substrate 21 opposing the sensor member 3 to mask a first wiring pattern 35 and a second wiring pattern 36. An inclined section 22a is provided at the inner edge of the decorative layer 22, and a transparent filler 41, which covers a light-transmissive region 21b of the transparent substrate 21 and part of the inclined section 22a, is disposed inward of the decorative layer 22. The protective member 2 and the sensor member 3 are bonded together with an adhesive layer 51, which is stacked on the decorative layer 22 and the transparent filler 41.

In the third embodiment, the unlevel section formed by the decorative layer 22 and the transparent substrate 21 is gradual because the inclined section 22a is provided; therefore, bubbles do not form in the light-transmissive region 21b near the unlevel section 23. The influence of the unlevel section at the decorative layer 22 is reduced by stacking the transparent filler 41, and thus, the thickness of the adhesive layer 51 is reduced. In the known input device 101, such as that illustrated in FIGS. 12 and 13, having a resistive touch sensor, a steep unlevel section at the decorative printing layer 141b causes the input-surface side of the decorative printing sheet 141a to be affected by the unlevel section because the decorative printing sheet 141a is made of a flexible film. In such a case, the unlevel section at the decorative printing sheet 141a is directly visible by the operator, producing a poor external appearance. In this embodiment, since the influence of the unlevel section can be reduced by providing the transparent filler 41, as illustrated in FIG. 8, the protective member 2 and the sensor member 3 can be bonded together while maintaining a flat input-side surface of the transparent substrate 21. Thus, the input device 1 has an excellent external appearance without any unlevel sections on the input surface.

Method of Producing Input Apparatus

Figure 9A:
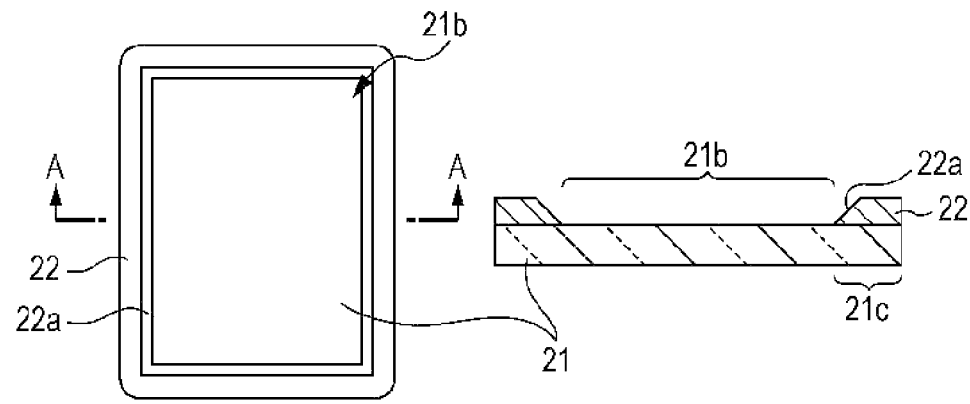
FIGS. 9A to 9C are process diagrams illustrating a method of producing an input device according to the present invention, where the left sections of FIGS. 9A to 9C are plan views of the production process, and the right sections are sectional views taken along lines A-A, B-B, and C-C in the plan views.
Figure 9B:
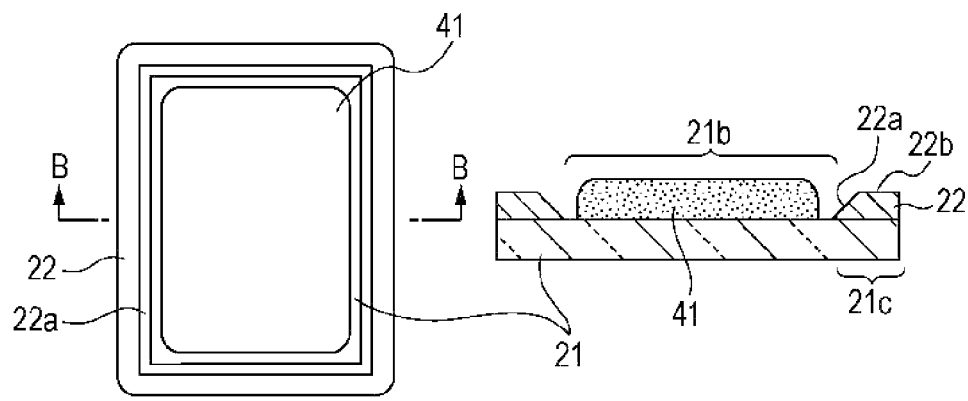
Figure 9C:
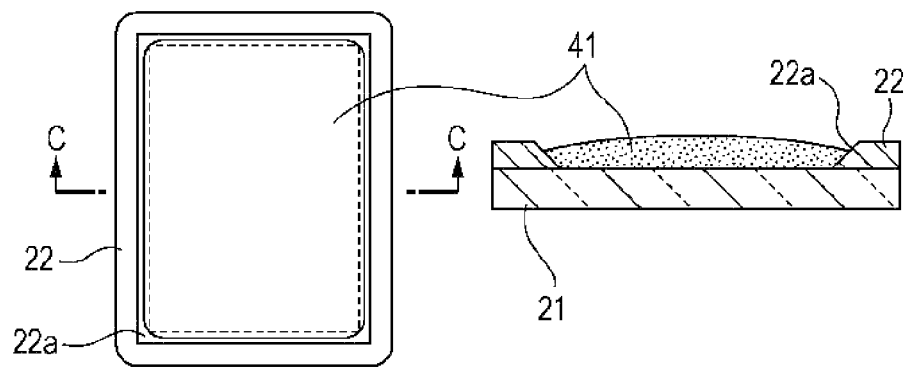

A method of producing the input device 1 will be described below. FIGS. 9A to 9C and 10A to 10C are process diagrams illustrating a method of producing the input device 1 according to the present invention. FIGS. 9A, 9B, and 9C are plan views and sectional views, where the left sections are plan views of the production process, and the right sections are sectional views taken along lines A-A, B-B, and C-C in the plan views. FIGS. 9A to 9C and 10A are sectional views with the input-surface side illustrated at the bottom.

FIG. 9A illustrates a step of producing the protective member 2, which protects the surface of the sensor member 3. First, the transparent substrate 21 is prepared. The transparent substrate 21 is made of a resin substrate or a glass substrate, which transmits visible light. The decorative layer 22 is disposed on the periphery of the surface of the transparent substrate 21. In this way, the part of the transparent substrate 21 that covers the decorative layer 22 in plan view constitutes the non-transmissive region 21c, and the center part of the transparent substrate 21 surrounded by the decorative layer 22 constitutes the window-like light-transmissive region 21b, which transmits light in the thickness direction. The inclined section 22a, which is tapered toward the inner area of the light-transmissive region 21b, is provided at the inner edge of the decorative layer 22. The decorative layer 22 can be formed by a printing method, such as screen printing or ink-jet printing. Instead of a printing method, a transfer method or a deposition method may be employed to form the decorative layer 22.

In the step illustrated in FIG. 9A, the inclination angle of the inclined section 22a may be varied. If the inclination angle is larger than 30°, the thickness of the decorative layer 22 can be very precisely controlled, and a satisfactory masking effect is achieved by the decorative layer 22. If the inclination angle is set in the range of 5° to 30°, the thickness of the decorative layer 22 can be extremely precisely controlled. If the inclination angle is set in the range of 3° to 5°, the thickness of the decorative layer 22 can be satisfactorily controlled. It is undesirable to set the inclination angle smaller than 3° because the masking effect of the decorative layer 22 may be too small.

As illustrated in FIG. 9B, the transparent filler 41 is disposed on the light-transmissive region 21b of the transparent substrate 21 with a gap provided between the disposed transparent filler 41 and the decorative layer 22. The transparent filler 41 may be a resin that transmit visible light, e.g., acrylic resin. The transparent filler 41 can be applied easily by a printing method, such as screen printing or ink-jet printing, using a paste, such as acrylic resin, or ink. It is desirable that the gap formed between the transparent filler 41 and the decorative layer 22 be in the range of approximately 3 to 500 μm. The transparent filler 41 may be directly printed onto the inclined section 22a or the main surface 22b of the decorative layer 22 without providing the gap between the transparent filler 41 and the decorative layer 22. This, however, is undesirable because it is difficult to control the thickness and shape of the transparent filler 41, and the unlevel section formed by the decorative layer 22 and the transparent filler 41 is steep. It is also undesirable to directly print the transparent filler 41 on the unlevel section 23 formed by the transparent substrate 21 and the decorative layer 22 because bubbles may form in the light-transmissive region 21b near the unlevel section 23.

FIG. 9C illustrates a step of holding the transparent substrate 21 on which the transparent filler 41 has been applied for a predetermined amount of time after the step illustrated in FIG. 9B is performed. Since the transparent filler 41 is a fluent paste or ink, by holding the transparent substrate 21 for a predetermined amount of time, the transparent filler 41 levels and spreads on the surface of the transparent substrate 21 to cover the entire light-transmissive region 21b and part of the inclined section 22a. The predetermined amount of time is preferably in the range of 5 to 90 seconds and, more preferably, in the range of 30 to 60 seconds. In this way, the thickness of the transparent filler 41 can be controlled, and the influence of the unlevel sections at the decorative layer 22 can be reduced. By holding the transparent filler 41 for a predetermined amount of time, the transparent filler 41 spreads on and closely adheres to the surfaces of the transparent substrate 21 and the inclined section 22a, preventing bubble formation at the unlevel section 23.

By changing the inclination angle of the inclined section 22a formed in the step illustrated in FIG. 9A, the spreading of the transparent filler 41 in the step illustrated in FIG. 9C can be controlled, and the thickness and shape of the transparent filler 41 can be controlled. For example, when the inclination angle is set in the range of 30° to 60°, the thickness of the transparent filler 41 can be controlled extremely precisely, and size of the unlevel section formed by the transparent filler 41 and the decorative layer 22 can be significantly reduced. Since the angle of the unlevel section 23 formed between the decorative layer 22 and the transparent substrate 21 is gradual, when the transparent filler 41 spreads, bubbles do not form near the unlevel section 23. When the inclination angle is set in the range of 5° to 30°, the thickness of the transparent filler 41 can be satisfactorily controlled, and the transparent filler 41 spreads easily on the inclined section 22a, significantly reducing the size of the unlevel section formed by the transparent filler 41 and the decorative layer 22. When the inclination angle is set in the range of 3° to 5°, the thickness of the transparent filler 41 can be satisfactorily controlled. In such a case, the transparent filler 41 protrudes with respect to the decorative layer 22. It is undesirable to set the inclination angle smaller than 3° because the transparent filler 41 will protrude with respect to the decorative layer 22, and the size of the unlevel section 24 formed by the transparent filler 41 and the decorative layer 22 will increase. It is undesirable to set the inclination angle larger than 60° because the angle of unlevel section 23 becomes sharp, although the thickness of the transparent filler 41 can be satisfactorily controlled; this is undesirable because bubbles may form in the light-transmissive region 21b near the unlevel section 23.

Figure 10A:
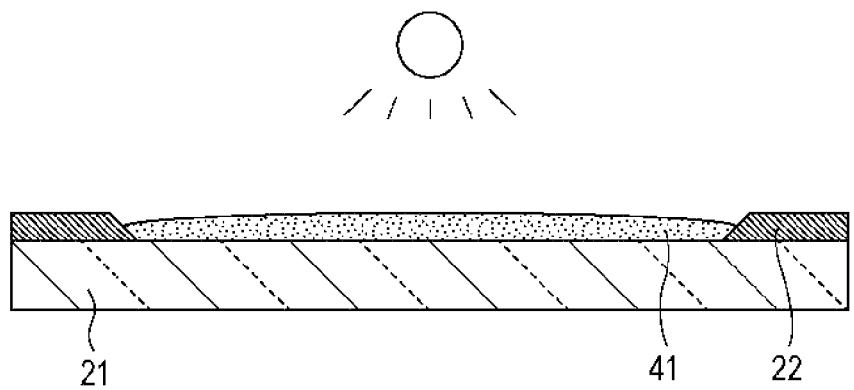
FIGS. 10A to 10C are process diagrams illustrating a method of producing an input device according to the present invention.

Then, the transparent filler 41 is cured. It is desirable to use a UV curable resin, e.g., UV curable acrylic resin, for the transparent filler 41. In this way, the transparent filler 41 can be cured in a short amount time because the transparent filler 41 can be cured by irradiating the transparent filler 41 with ultraviolet rays from a light source, as illustrated in FIG. 10A, and is suitable for mass production. Since the temperature change and volume contraction are small during curing, bubble formation and separation do not occur at the boundary of the transparent filler 41 and the transparent substrate 21 during curing. The transparent substrate 21 does not warp because residual stress is small after curing. In addition to an ordinary-temperature UV curable resin, a UV/heat curable resin may be used. Bubble formation, separation, warpage of the transparent substrate 21, etc., do not occur if contraction and stress are small; therefore, for example, urethane, polyacrylic, or epoxy UV/heat curable resin can be used.

Figure 10B:
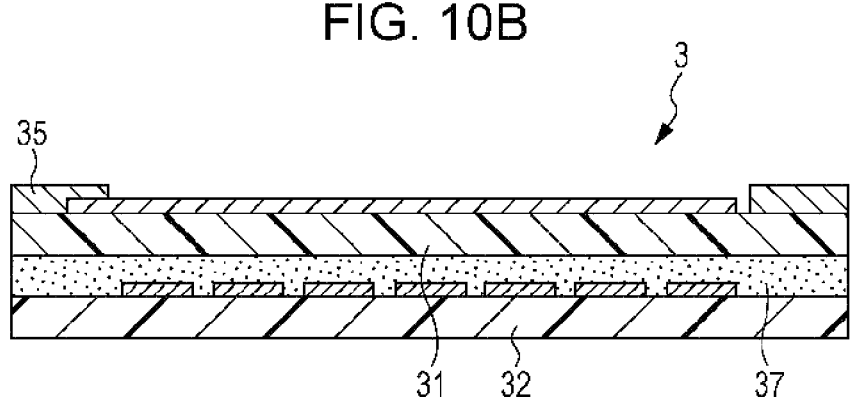

FIG. 10B illustrates a step of preparing the sensor member 3. The sensor member 3 illustrated in FIG. 10B is a capacitance touch sensor, and details of the step are not illustrated. A film of, for example, polyethylene terephthalate (PET) is used to form the first sensor substrate 31 and the second sensor substrate 32 of the sensor member 3. Then, the first electrode pattern 33 and the second electrode pattern 34 are formed on the surfaces of the first sensor substrate 31 and the second sensor substrate 32. The first electrode pattern 33 and the second electrode pattern 34 are formed of a transparent conductive material, such as indium tin oxide (ITO), $SnO_2$, or ZnO, by sputtering or deposition. The sensor member 3 may also be prepared by providing a film material on which a transparent conductive film is provided, and transferring the transparent conductive film onto the first sensor substrate 31 and the second sensor substrate 32 or by applying a liquid material.

On the periphery of the first sensor substrate 31 and the second sensor substrate 32, a first wiring pattern 35 and a second wiring pattern 36 (not shown), which are connected to external flexible printed circuit boards, etc., are formed. Similar to the first electrode pattern 33 and the second electrode pattern 34, the first wiring pattern 35 and the second wiring pattern 36 can be formed by sputtering or a thin film method. Instead, the first sensor substrate 31 and the second sensor substrate 32 may be formed by printing after forming the first electrode pattern 33 and the second electrode pattern 34.

The first sensor substrate 31 and the second sensor substrate 32, which are formed this way, are bonded together with an adhesive layer 37 to produce a capacitance touch sensor, such as that illustrated in FIG. 10B. In the sensor member 3, a capacitance is formed between the first electrode pattern 33 and the second electrode pattern 34, and input position information can be detected by reading the change in the capacitance. The adhesive layer 37 is a transparent acrylic adhesive tape having a thickness in the range of 10 to 50 μm, e.g., 25 μm.

Figure 10C:
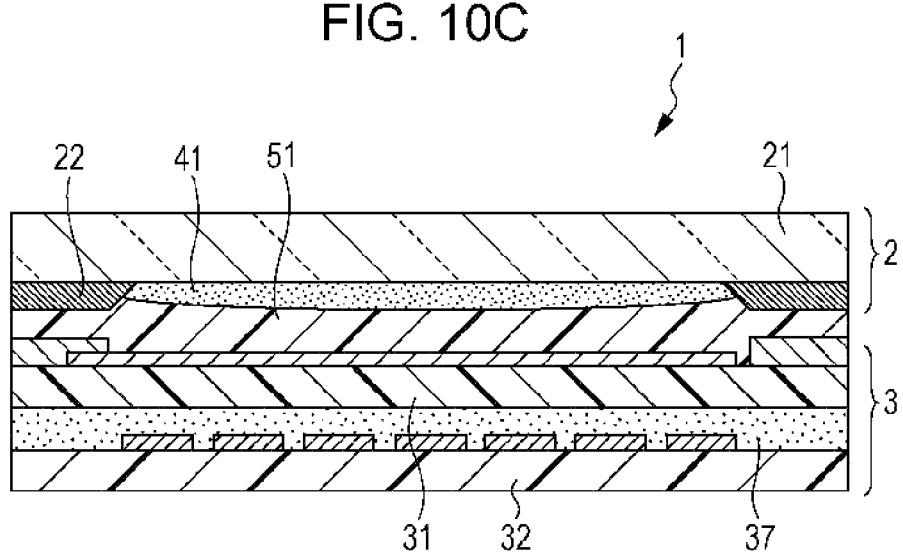

FIG. 10C is a sectional view of the input device 1 prepared by bonding together the protective member 2 and the sensor member 3 with the adhesive layer 51 disposed therebetween. The decorative layer 22, the first wiring pattern 35, and the second wiring pattern 36 (not shown) are stacked in this order and bonded together. In this way, the first wiring pattern 35 and the second wiring pattern 36 are not directly visible by the operator.

With the method of producing the input device 1 according to the present invention, the influence of the unlevel section at the decorative layer 22 is reduced by providing the inclined section 22a formed by the decorative layer 22 and the transparent filler 41, and thus, the thickness of the adhesive layer 51 can be reduced. Since bubble formation and separation of the adhesive layer 51 do not occur in the light-transmissive region 21b near the unlevel section 23 of the decorative layer 22, the bonding step can be easily performed.

The steps illustrated in FIGS. 9A to 10A are performed in this order. The step illustrated in FIG. 10B is not limited to being performed after the steps illustrated in FIGS. 9A to 10A, so long as it is performed before the step illustrated in FIG. 10C. The step illustrated in FIG. 10B is practically performed simultaneously with the steps illustrated in FIGS. 9A to 10A.

Figure 11A:
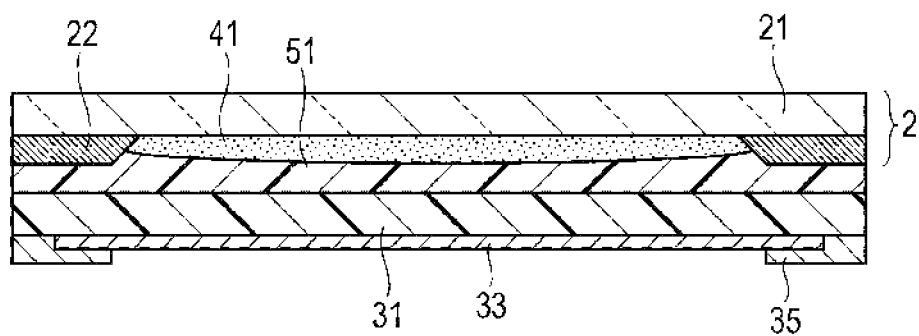
FIGS. 11A and 11B are process diagrams illustrating a method of producing an input device according to a variation of the present invention.
Figure 11B:
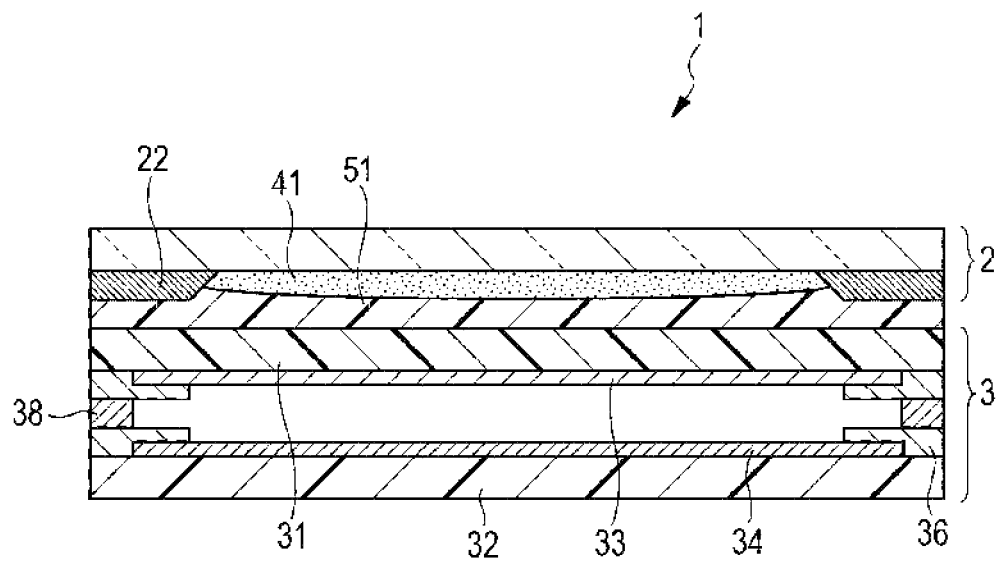

FIGS. 11A and 11B illustrate a variation of a method of producing the input device 1. In this variation, a method of producing a resistive touch sensor as the sensor member 3 will be described. The steps illustrated in FIGS. 9A to 9C and 10A are the same as those in the method of producing the input device 1 described above, and details thereof are not repeated. In this variation, since a resistive touch sensor is produced as the sensor member 3, the transparent substrate 21, which constitutes the input surface, is made of a flexible film of, for example, polyethylene terephthalate (PET), which flexibly deforms in response to push operation.

FIG. 11A illustrates a step of bonding together the protective member 2 and the first sensor substrate 31 with the adhesive layer 51. FIG. 11B illustrates a step of producing the resistive touch sensor.

On one of the surfaces of the first sensor substrate 31, the first electrode pattern 33 and the first wiring pattern 35 surrounding the periphery of the first electrode pattern 33 are formed. The first electrode pattern 33 is formed of a transparent conductive material, such as indium tin oxide (ITO), SnO2, or ZnO, by sputtering or deposition. Instead of sputtering or deposition, a transfer method or an application method may be used. The first wiring pattern 35 is formed by a printing method using paste containing a conductive metal filler, such as silver or copper.

As illustrated in FIG. 11A, the protective member 2, which is prepared in advance through the steps illustrated in FIGS. 9A to 9C and 10A, and the other surface of the first sensor substrate 31 are bonded together with the adhesive layer 51. At this time, the decorative layer 22 is stacked on the first wiring pattern 35 to form a flat plate. In this way, the first wiring pattern 35 is masked by the decorative layer 22 and is not directly visible by the operator.

Similar to the transparent substrate 21, the first sensor substrate 31 is made of a flexible film of, for example, polyethylene terephthalate (PET), which flexibly deforms in response to push operation. In this way, even when the first sensor substrate 31 and the transparent substrate 21 are bonded together, input position information can be detected because the first sensor substrate 31 and the transparent substrate 21 flexibly deform in response to push operation.

Similar to the first sensor substrate 31, the second electrode pattern 34 and the first wiring pattern 35 are formed on the second sensor substrate 32. The second sensor substrate 32 is made of a transparent resin substrate of, for example, polycarbonate (PC), polyethylene terephthalate (PET), polyether sulphone (PES), methyl methacrylate resin (PMMA), or norbornene resin.

As illustrated in FIG. 11B, the first sensor substrate 31 and the second sensor substrate 32 are disposed with a gap formed therebetween such that the their electrode patterns oppose each other and are bonded together with the spacer 38 interposed therebetween. In this way, the input device 1 including the resistive touch sensor can be produced.

With the input device 1 having a resistive touch sensor according to this variation, a predetermined gap is formed between the first sensor substrate 31 and the second sensor substrate 32. Such as in the production method according to this variation, by bonding together the first sensor substrate 31 and the protective member 2 in advance and then bonding the second sensor substrate 32, the shape of the gap can be easily maintained while producing the input device 1.

With the method of producing the input device 1 according to this variation, the advantages of the present invention are achieved while bubble formation in the light-transmissive region 21b near the decorative layer 22 is prevented. By providing the transparent filler 41, the influence of the unlevel sections at the decorative layer 22 is reduced, and the thickness of the adhesive layer 51 can be reduced. In this way, the input device 1 with a reduced thickness can be provided.

What is claimed is:

1. An input device comprising:
   a sensor member configured to detect input position information;
   a protective member configured to protect the sensor member; and
   an adhesive layer bonding the sensor member and the protective member together, the adhesive layer transmitting visible light,
   wherein the protective member includes:
      a transparent substrate having a first surface providing an input surface and a second surface opposite to the first surface and facing the sensor member;
      a light-transmissive region configured to transmit light in a thickness direction of the transparent substrate;
      a decorative layer disposed on the second surface of the transparent substrate, the decorative layer surrounding and defining the light-transmissive region, an inner edge portion of the decorative layer having an inclined section tapered toward the light-transmissive region; and
      a transparent filler provided on the second surface of the transparent substrate to cover the light-transmissive region and at least part of the inclined section of the decorative layer, the transparent filler transmitting visible light,
   and wherein the sensor member and the protective member are bonded together with the adhesive layer disposed on the transparent filler and the decorative layer.

2. The input device according to claim 1, wherein an inclination angle of the inclined section with respect to the second surface of the transparent substrate is in a range of 3° to 60°.

3. The input device according to claim 1, wherein an inclination angle of the inclined section with respect to the second surface of the transparent substrate is in a range of 5° to 60°.

4. The input device according to claim 1, wherein an inclination angle of the inclined section with respect to the second surface of the transparent substrate is in a range of 30° to 60°.

5. The input device according to claim 1, wherein the transparent filler is a resin transmitting visible light.

6. The input device according to claim 1, wherein the transparent filler is an ultraviolet curable resin.

7. The input device according to claim 1, wherein the sensor member is a capacitive touch sensor.

8. The input device according to claim 1, wherein the sensor member is a resistive touch sensor.

9. The input device according to claim 1, wherein
the sensor member includes:
a sensor substrate having an electrode pattern formed on a first surface and configured to detect input position information; and
a wiring patter disposed on the first surface and periphery of the electrode pattern,
wherein the first surface of the sensor substrate faces the protective member, and the electrode pattern and the wire pattern together form a depression on the first surface,
wherein the transparent filler and the decorative layer on the second surface of the transparent substrate of the protective member form a protrusion, and
wherein the protective member and the sensor member are stacked by engaging the depression and the protrusion with the adhesive layer therebetween.

10. A method of producing an input device comprising the steps of:
providing a protective member including a transparent substrate, the transparent substrate having a first surface providing an input surface and a second surface opposite to the first surface, the providing a protective member comprising;
a) forming a decorative layer on the second surface of the transparent substrate, the decorative layer surrounding and defining a light-transmissive region and having an inclined section tapered toward the light-transmissive region at an inner edge portion thereof;
b) applying a transmissive filler material in the light-transmissive region of the transparent substrate with a gap provided between the transparent filler material and the decorative layer;
c) allowing the transparent filler material to spread over the gap and adhere to the light-transmissive region of the transparent substrate and at least part of the inclined section of the decorative layer by maintaining the transparent substrate with the applied transparent filler material for a predetermined period of time; and
d) curing the transparent filler material to form a transparent filler; and
combining the protective member with a sensor member configured to detect input position information, the combining comprising:
e) bonding the protective member and the sensor member with an adhesive layer disposed over the transparent filler and the decorative layer.

11. The method of producing an input device according to claim 10, wherein, in step a, an inclination angle of the inclined section with respect to the second surface of the transparent member is in a range of 3° to 60°.

12. The method of producing an input device according to claim 10, wherein, in step a, an inclination angle of the inclined section with respect to the second surface of the transparent member is in a range of 5° to 60°.

13. The method of producing an input device according to claim 10, wherein, in step a, an inclination angle of the inclined section with respect to the second surface of the transparent member is in a range of 30° to 60°.

14. The method of producing an input device according to claim 10, wherein, in step b, the transparent filler material is a transparent resin.

15. The method of producing an input device according to claim 10, wherein, in step b, the transparent filler material is applied by a printing method.

16. The method of producing an input device according to claim 10, wherein, in step d, the transparent filler material is cured by irradiating the transparent filler material with ultraviolet rays.

17. The method of producing an input device according to claim 10, wherein, in step e, the sensor member is a capacitive touch sensor.

18. The method of producing an input device according to claim 10, wherein, in step e, the sensor member is a resistive touch sensor.

19. The method of producing an input device according to claim 10, wherein in step e, the decorative layer is placed over a wiring pattern of the sensor member.

* * * * *